No. 622,260. Patented Apr. 4, 1899.
T. J. POOLE.
AUTOMATIC PLAYING ATTACHMENT FOR PIANOS.
(Application filed May 10, 1897.)
(No Model.) 8 Sheets—Sheet 1.

Fig. 1.

WITNESSES
INVENTOR
Thomas J. Poole,
Per Edwin W. Brown,
Attorney.

No. 622,260. Patented Apr. 4, 1899.
T. J. POOLE.
AUTOMATIC PLAYING ATTACHMENT FOR PIANOS.
(Application filed May 10, 1897.)

(No Model.) 8 Sheets—Sheet 2.

Fig. 2.

Witnesses
Inventor
Thomas J. Poole,
Per Edwin W. Brown,
Attorney.

No. 622,260. Patented Apr. 4, 1899.
T. J. POOLE.
AUTOMATIC PLAYING ATTACHMENT FOR PIANOS.
(Application filed May 10, 1897.)
(No Model.) 8 Sheets—Sheet 3.

Fig. 3.

WITNESSES
Florence J. Garrett.
J. J. Mackin

INVENTOR
Thomas J. Poole,
Per Edwin W. Brown.
Attorney.

No. 622,260. Patented Apr. 4, 1899.
T. J. POOLE.
AUTOMATIC PLAYING ATTACHMENT FOR PIANOS.
(Application filed May 10, 1897.)
(No Model.) 8 Sheets—Sheet 4.

Witnesses
Florence J. Garrett
J. J. Mackin

Inventor
Thomas J. Poole,
Per Edwin W. Brown,
Attorney.

No. 622,260. Patented Apr. 4, 1899.
T. J. POOLE.
AUTOMATIC PLAYING ATTACHMENT FOR PIANOS.
(Application filed May 10, 1897.)

(No Model.) 8 Sheets—Sheet 6.

WITNESSES
Florence I. Gauett.
J. J. Macken

INVENTOR
Thomas J. Poole,
Per Edwin W. Brown,
Attorney.

No. 622,260. Patented Apr. 4, 1899.
T. J. POOLE.
AUTOMATIC PLAYING ATTACHMENT FOR PIANOS.
(Application filed May 10, 1897.)

(No Model.) 8 Sheets—Sheet 8.

Fig. 19.

WITNESSES
Florence I. Garrett
J. J. Mackin

INVENTOR
Thomas J. Poole,
Per Edwin W. Brown,
Attorney.

UNITED STATES PATENT OFFICE.

THOMAS J. POOLE, OF BOSTON, MASSACHUSETTS, ASSIGNOR TO THE AUTONO COMPANY, OF SAME PLACE.

AUTOMATIC PLAYING ATTACHMENT FOR PIANOS.

SPECIFICATION forming part of Letters Patent No. 622,260, dated April 4, 1899.

Application filed May 10, 1897. Serial No. 635,878. (No model.)

*To all whom it may concern:*

Be it known that I, THOMAS J. POOLE, of Boston, in the county of Suffolk and State of Massachusetts, have invented certain new and useful Improvements in Automatic Playing Attachments for Pianos, &c., of which the following is a full, clear, and exact description.

This invention has for its object the automatic playing of a pianoforte by the movement of a perforated music-sheet over air-ducts in communication with pneumatic valves and pneumatic bellows for the operation of the keys of the pianoforte; and the invention consists, in combination with the keys of a pianoforte and perforated music-sheet for operation thereof, of certain construction and arrangement of the race-board over which the perforated music travels, all substantially as hereinafter fully described; and the invention also consists of the construction and arrangement of other parts in connection therewith for the proper operation thereof, all substantially as hereinafter fully described, reference being had to the accompanying sheets of drawings, in which is illustrated a pianoforte having this invention applied thereto.

Fig. 13 is a detail sectional and side view to be hereinafter referred to. Figs. 14, 14$^a$, 14$^b$, 14$^c$, 14$^d$, and 14$^e$ represent in perspective the several parts separate from each other, forming the raceway over which the perforated music-sheet travels. Figs. 15 and 16 represent in vertical cross-section on two separate lines the raceway formed by the attaching together of the several parts shown in Figs. 14 to 14$^e$, inclusive, and showing the air-passages through it. Fig. 17 is a horizontal section on line 17 17, Fig. 18. Fig. 18 is a vertical section on line 18 18, Fig. 17.

In the drawings is represented an upright pianoforte constructed and arranged for operation in the usual manner of making upright pianofortes and needing no particular description herein, except so far as it is necessary in the description of the present invention and its connections therewith, and in the drawings A represents the case or frame of an upright piano, and B the piano-action, constructed in the usual manner, of which action C is a key.

Figure 1:
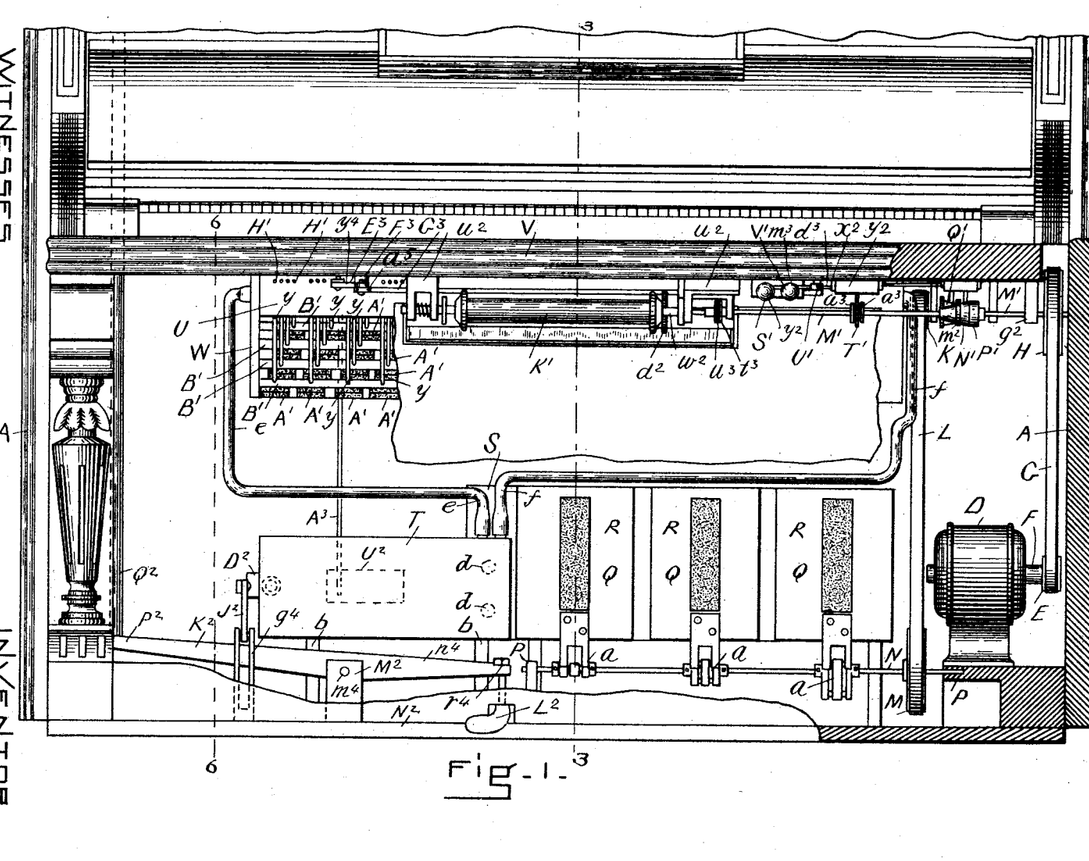
Figure 1 represents a front view of the lower part of an upright pianoforte below a horizontal plane just above the keys and having this invention applied thereto, some of the parts being broken out and in section to more fully show the construction and operation.

D represents an electric motor or any suitable motive power, and from a pulley E on its shaft F runs a belt G upward to another larger pulley H, secured on one end of a horizontal shaft J, adapted to turn in bearings in the framework of the piano-case. On the other end of this shaft J is a pulley K, which connects by a belt L with another pulley M on a horizontal shaft N, turning in bearings in supports P near the bottom of the piano-case, to which shaft N are connected three separate and independent crank-arms $a$, which are also connected to movable boards Q, respectively, of three separate vertical exhaust-bellows R, which are attached to and communicate with a vertical wind-chest S back of the exhausters. (Shown more particularly in Fig. 3.) At one end of this wind-chest S is an exhaust-bellows T, supported edgewise on supports $b$, communicating with the wind-chest by openings $d$. (Shown in dotted lines, Fig. 1.)

As the motor is operated the shafts J and N are revolved and the exhausters R operated, which exhausts the air from the wind-chest S and bellows T in the usual manner of exhaust-bellows. Connected to and communicating with one end of the exhaust-bellows T are two tubes $e\,f$, which lead therefrom and are connected, respectively, with the ends of a primary pneumatic box U, secured to the under side of the key-bed V of the piano-case and between two upright boards W. These tubes form communication between the chamber of the exhaust-bellows T and chamber $g$ of primary box U.

Below the primary pneumatic box U are four horizontal rows of pneumatic bellows A', one above the other, the upper or stationary boards $h$ of which are secured to the under sides of four boards B', respectively, horizontally arranged and secured to the uprights W. These boards B', to which the pneumatic bellows A' are attached, are beveled transversely upon their under sides, so that when the pneumatic bellows attached thereto are open their movable boards $m$ will be horizontal, or substantially so.

There is one pneumatic bellows for each key of the piano desired to be operated; but for the better adaptation of this invention to various scales of pianos in the manufacture of this attachment for general use a few more of the pneumatic bellows are added than necessary for the number of keys to be operated, so that in adapting the attachment to the various scales of different manufacturers of pianofortes the pneumatic bellows to be operated will all be in line or each substantially under the rear end of the key to be operated, so that the connections between the pneumatic bellows can be satisfactorily and practically arranged.

Figure 3:
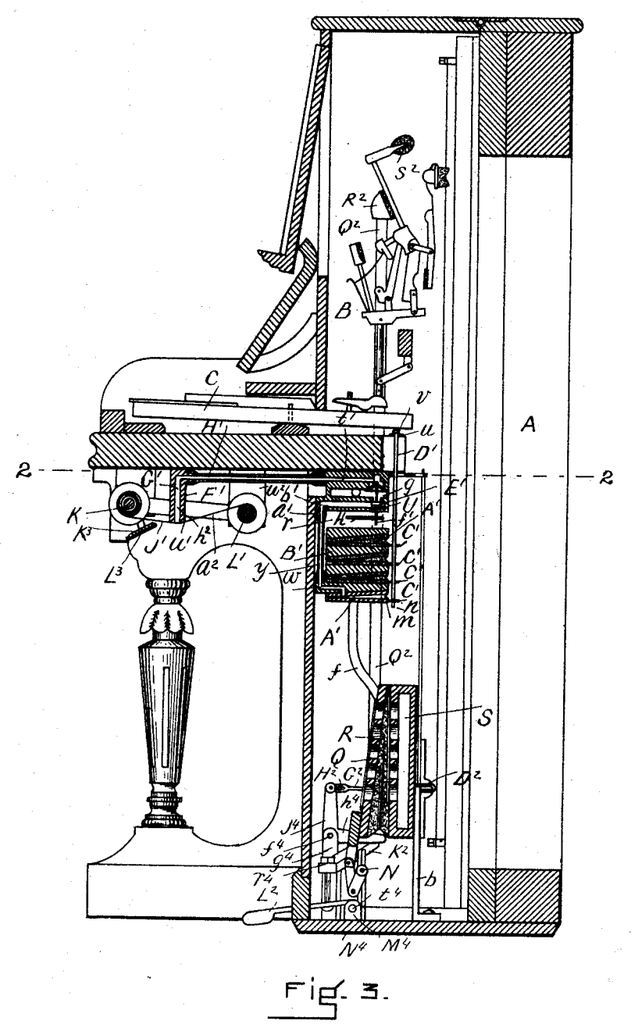
Fig. 3 is a central vertical section on line 3 3, Fig. 1.
Figure 4:
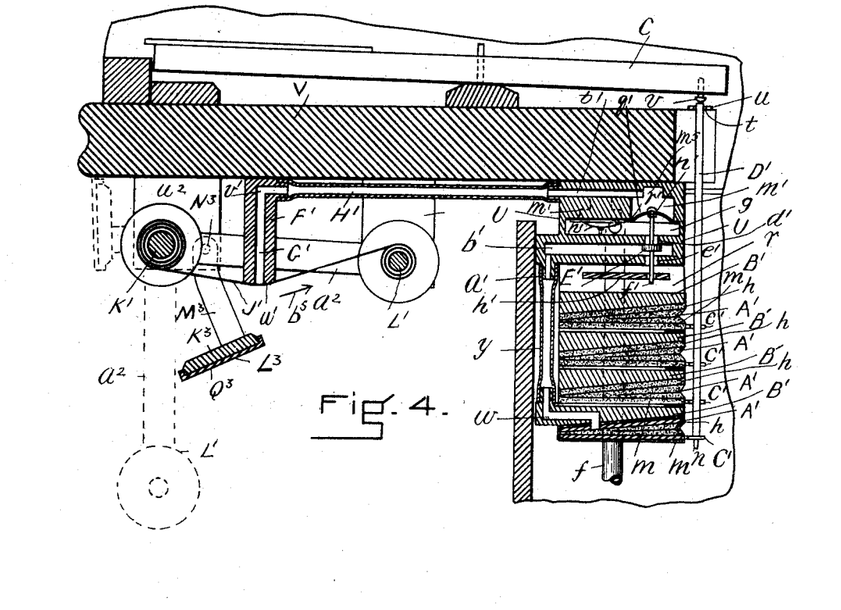
Fig. 4 is a detail vertical cross-section similar to Fig. 3, but on an enlarged scale.
Figure 5:
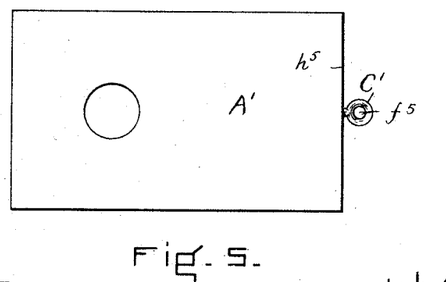
Fig. 5 is a detail plan view.
Figure 9:
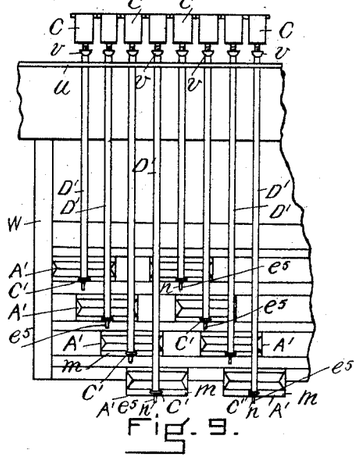
Fig. 9 is a detail rear view.
Figure 10:
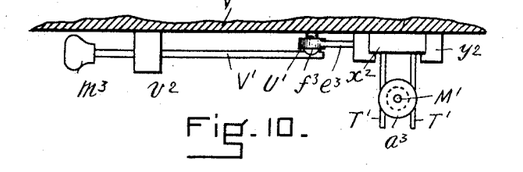
Fig. 10 is a detail side view and section on line 10 10, Fig. 2.

Between the upper board, to which the upper row of pneumatic bellows A' is secured, and primary pneumatic box U is an open space $r$. Screwing into the rear end of each movable board $m$ of each of these pneumatic bellows is a screw-eye C', on which rests the lower end of an upright rod or sticker D', it being held in place thereon by a pin $n$, disposed in the eye C' and projecting downward from the end of the sticker. The upper end of this rod extends upward through an opening $t$ in a strip $u$, secured to the rear of the action-bed V, to the head of a screw $v$, screwing into the under side of the end of a key C, as shown in Figs. 3, 4, and 9. When the key and its respective pneumatic bellows are in their normal position, the screw $v$ is turned out sufficiently for its head to be close to the upper end of the sticker, so that as the sticker is forced upward by the movement of the pneumatic bellows the key will be immediately acted upon by the sticker; but the screw should not be so near to the sticker as to interfere with the movements of the key in playing the piano by hand. This screw enables proper adjustment of these parts. These pneumatic bellows necessarily being wider than the keys, are arranged in four horizontal rows in order to get the number required within the compass of the number of keys used by this attachment in the instrument, the bellows following one after the other, as shown more particularly in Fig. 1, from the lower row to the upper row, and so on for the whole number. In each stationary board of each pneumatic bellows A' is an air-passage $w$, which leads to and communicates with the pneumatic bellows, a separate passage for each pneumatic bellows, and outside it is connected by an india-rubber tube $y$ with a small tube $a'$, opening into an air-passage $b'$ in the primary pneumatic box U below its chamber $g$. This passage $b'$ has an opening $d'$ into the chamber $g$ and from the under side an opening $e'$ into the open air-space $r$. In this passage $b'$ is a valve E' between the two openings $d'$ and $e'$, having a central vertical stem $f'$, its lower portion extending downward through the opening $e'$ and through an opening $g'$ in a fixed board $h$, which serves as a guide to the valve-stem, and its upper portion extending upward through the opening $d'$ into the box-chamber $g$, and to its upper end is centrally secured a piece of flexible material $n'$, such as india-rubber, which at its edges is secured at $r'$ to the block covering a small chamber $m'$ above the chamber $g$, forming a flexible diaphragm between the two chambers $g$ and $m'$, which diaphragm is sufficiently flexible to be moved up and down with the valve-stem in its operation, the diaphragm having a hole or opening $q'$ through it which allows for the escape of the air therethrough from one chamber to the other in the operation of the valve, the diaphragm in its normal position being curved or bent upward more or less into the chamber $m'$, as shown in Fig. 4. This chamber $m'$ has an air-passage $t'$ leading through to the outside of the box at the front.

Extending downward from and secured to the under side of the key-bed is a transverse board F', having a longitudinal row of air ducts or passages G' opening at the lower edge $u'$ to the outside. At their upper ends each communicates with a separate passage $v'$, extending backward, which is connected by an india-rubber tube H' with the air-passage $t'$ in the box communicating with a chamber $m$ in the box U, as shown in Fig. 4. This board F', with the air ducts or passages G', constitutes the raceway, over or under which travels the perforated music-sheet J', as shown in Figs. 3 and 4, and in order to make it practical and at as cheap a cost as possible and at the same time enable the air ducts and passages to be of small size and close together to reduce the raceway-board F' to its shortest length in order that the perforated music-sheet may be quite narrow the raceway is constructed substantially as follows, as illustrated more particularly in Figs. 14, 14$^a$, 14$^b$, 14$^c$, 14$^d$, and 14$^e$, the several parts L' M' N' P' Q' R' being in detail separated from each other and in perspective. The central board L, Fig. 14, is made by cutting or sawing transverse grooves through its width $a^2$ on each side, which alternately extend from each outer side to a line beyond the central longitudinal line of the board.

Figures 14, 14A, 14B, 14C, 14D, 14E, 15, 16, 17, 18:
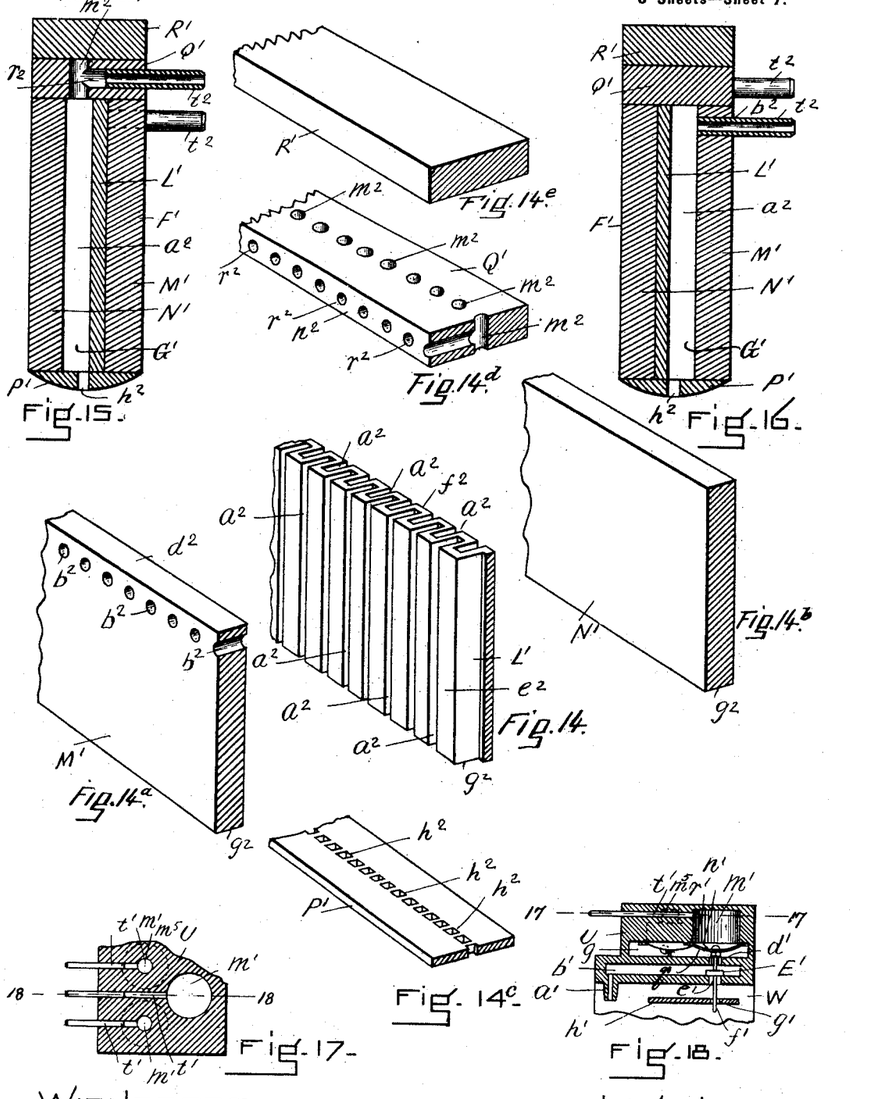
Figure 19:
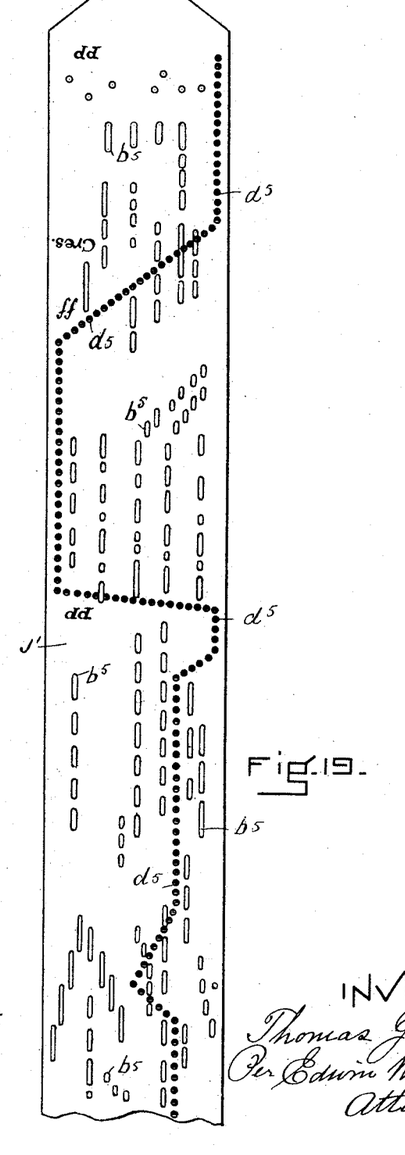
Fig. 19 is a plan view of one end of the perforated music-sheet.

The piece M', Fig. 14$^a$, has a series of holes $b^2$ through its thickness near its upper edge $d^2$ and is secured to the side $e^2$ of the central board L', closing the sides of the grooves $a^2$, but so that its holes $b^2$ are opposite to and communicate with the grooves $a^2$ on such side, and at the same time the plain and solid piece N', Fig. 14$^b$, is secured to the other side $f^2$ of the central board L', which closes the sides of the grooves on such side, which makes the series of passages G' of the raceway through the combined piece. On the edge $g^2$ of the combined piece is then secured the thin board P', Fig. 14$^c$, having a central longitudinal line of holes $h^3$ through it, these holes $h^2$ being over the inner ends or sides of the grooved passages $a^2$ in both sides of the central board L' and communicating with each one, because the grooves $a^2$ extend alternately laterally beyond the central longitudinal line of the board, as described and as shown in section in Figs. 15 and 16, which are sections respectively through two adjacent grooves $a^2$, these holes $h^2$ making the outer ends of the air-ducts G'.

At the same time the board P' is secured as above described, the board Q', Fig. 14$^d$, having a series of holes $m^2$ in a longitudinal central line through its thickness, and from one edge $n^2$ a series of holes $r^2$, extending from the edge into the other series of holes $m^2$, is secured on the other edge of the combined piece and so that its holes $m^2$ will be over and communicate with the grooves or passages $a^2$ in the side $f^2$ of the central board L', and over this board Q' is secured a plain solid strip R', Fig. 14$^e$, which closes the holes $m'$ to the outside. These holes $r^2$ are the air-passages $v'$, leading from the air-ducts G', as shown in Fig. 4. These parts are preferably secured by glue or any suitable adhesive material and when all are secured they are planed and trued off on the outside as desired, the outer surface of the strip P' being rounded somewhat, as shown in Figs. 15 and 16, for the free movement of the music-sheet thereover in its travel.

Figure 12:
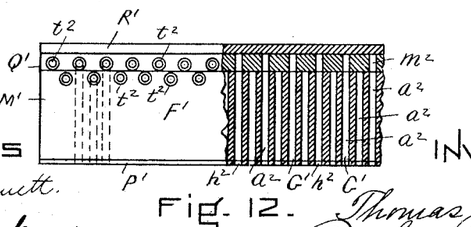
Fig. 12 is a detail rear view and vertical section of the raceway over which the perforated music-sheet travels.

Into each hole $b^2$ and $r^2$ is inserted a small metal tube $t^2$, and over each is the india-rubber tube II', extending to and communicating with the air-passage $t'$ in the pneumatic box U, these holes $b^2$ and $r^2$ and tubes $t^2$ being arranged alternately in two horizontal rows and overlapping each other, as shown in Fig. 12 more particularly.

K' is the music-roll, on which the perforated music-sheet J' is wound before being put into the instrument, located in front of the raceway F' and attached to shafts or pinions $w^2$, arranged to turn in bearings in supports $u^2$, secured to the under side of the key-bed V and adapted to be put into position and removed therefrom in any of the well-known ways of applying such music-rolls to musical instruments operated by a perforated music-sheet and not needing any particular description herein.

Figure 2:
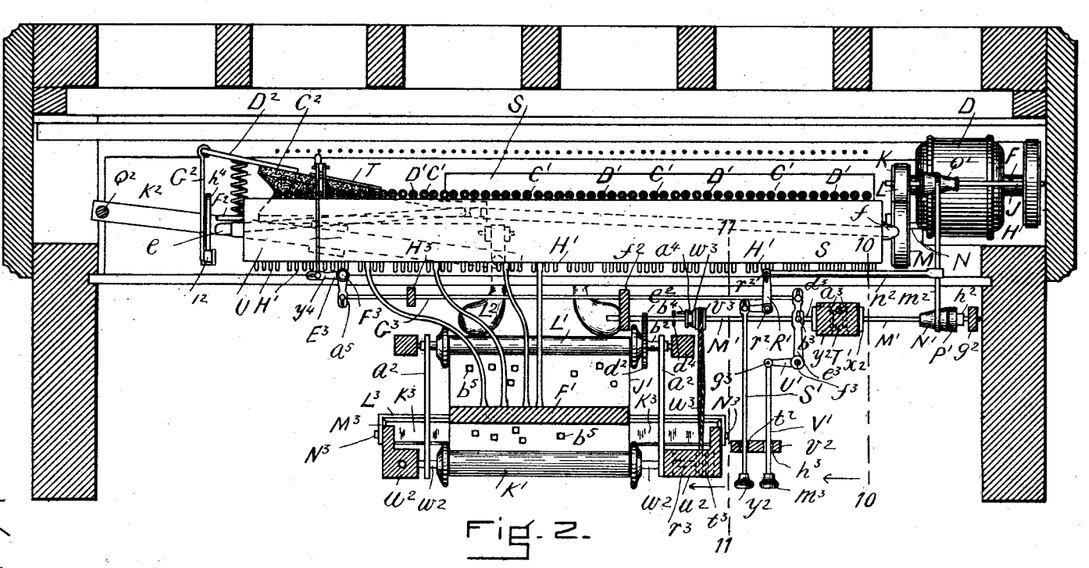
Fig. 2 is a horizontal section on line 2 2, Fig. 3.

L' is the take-up roll, adapted to turn by its journals in bearings in two arms $a^2$, pivoted on the music-roll shafts $w'$ and located in rear of the raceway, as shown. On the journal $b^2$ of the take-up roll L' is secured a gear $d^2$, which meshes with a gear $e^2$, secured on a shaft M', turning by one end in a support $f^2$ of the key-bed and by its other end in a support $g^2$ near the end of the piano-case. Secured on this shaft M' is a cone-pulley N', and at its end is a loose pulley P', held in place by a collar $h^2$, a belt running from this cone-pulley over another cone-pulley Q' on the shaft J, as shown in Fig. 2 more particularly. The upper side of the cone-pulley belt $m^2$ runs through an opening in an end of a shipper-rod $n^2$, which extends therefrom, and by its other end is pivoted to one arm of a bell-crank lever R', pivoted at $r^2$ to the key-bed, the other arm of the bell-crank lever being pivoted to a rod S', which extends toward the front of the keyboard through a guide-opening $t^2$ in a board $v^2$, secured to the key-bed and having a handle $y^2$ for operation thereof.

Pulling out or pushing in the rod S', connected to the shipper-rod $n^2$ of the cone-belt $m^2$, causes the shaft M' to turn respectively faster or slower correspondingly, so that its speed and that of the take-up roll, connected therewith by gears, can be varied as desired to cause the sheet to travel faster or slower, as required, to play the tune represented thereon correspondingly, which can be done at any time during the travel of the music-sheet over the raceway. Pushing the rod fully back the belt $m^2$ will be moved onto loose pulley P', by which the operation of the music-sheet will cease.

Secured to the under side of the key-bed is a box $y^2$, in which is arranged to slide back and forth transversely in relation to the piano a block $x^2$, having projecting down from its under side a forked arm T', which straddles the shaft M' between two flanges $a^3$, secured thereto and connected at $b^3$ to a rod $d^3$, secured to the block $x^2$, is one arm $e^3$ of a bell-crank lever U', pivoted at $f^3$ to the key-bed, its other arm pivoted at $g^3$ to the end of rod V', extending to the front through a guide-opening $h^3$ in the board $v^2$ side of the shipper-rod S' and having a handle $m^3$ for operation of the same.

The journal-pin of the music-roll at one end is adapted to engage with a short shaft $r^3$, turning in a bearing in the block $u^2$, and on this shaft is secured a pulley $t^3$, which is connected by a cross-belt $u^3$ to a pulley $v^3$ on the shaft M'. The pulley $v^3$ is loose on its shaft M', and attached to it is a circular block $w^3$, having a circumferential groove in which are disposed two arms $a^4$, projecting downward from and rigidly secured to the under side of the action-bed. Projecting from the side of this block $w^3$ is a pin $b^4$, and secured to the shaft M' are two radial pins $d^4$ opposite to each other, and when the shaft M' is moved back to disengage its gear $e^2$ from the take-up-roll gear $d^2$ its movement is sufficient for one of the pins $d^4$ to engage with the pin $b^4$ of the block $w^3$ and cause it to turn and by the cross-belt $u^3$ turn the music-roll in a direction the reverse of its motion when a tune is being played to rewind thereon the music-sheet from the take-up roll when desirous of either playing the tune over again or inserting another music-roll with another music-sheet to play another tune.

When the music-sheet is entirely rewound, the rod V' is pulled out, which moves the shaft M' to the left, its gear $e^2$ again engaging with the take-up-roll gear $d^2$ and its pins $d^4$ disengaging from the block-pin $b^4$, so that the take-up roll will be operated to move the music-sheet in playing the tune and the music-sheet roll free to turn for its music-sheet to be unwound therefrom in playing the tune.

Figure 13:
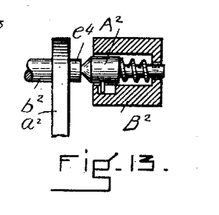

The frame $a^2$, carrying the take-up roll, is arranged to swing down on its pivoted bearings into a position at the front of the instrument, (shown in dotted lines in Fig. 4,) so that the free end of the music-sheet on the music-roll can be attached thereto in the usual manner when the frame is swung up into its place and locked there by a spring-bolt $A^2$ in a block $B^2$, secured to the action-bed, adapted to fit in a socket in a block $e^4$ of the frame-piece. (Shown in Fig. 13 in detail and enlarged.)

Extending from the end of the movable board $C^2$ of the main exhaust-bellows T is an arm $D^2$, to which is connected one end of a spiral spring $E^2$, its other end being disposed in a socket in an extension $F^2$ of the other board of the bellows, this spring acting by its tension to keep the exhaust-bellows open.

Connected to the arm $D^2$ of the exhaust-bellows is a rod which extends forward, and by its other end it is connected by a longitudinal slot $H^2$ to one arm of a bell-crank lever $J^2$, pivoted at $f^4$ to a support $g^4$, its other arm $h^4$ extending horizontally backward and projecting over a horizontal lever $K^2$, pivoted at $m^4$ to a support and extending toward the middle of the front of the piano, where its arm $n^4$ is connected at $r^4$ to a pedal $L^2$, pivoted at $l^4$ to a support $M^2$ of the bottom board $N^2$. The other arm $P^2$ of this lever extends toward the side of the case, and on such end rests and bears a vertical rod $Q^2$, which extends up to and just under the rail $R^2$, against which the hammers $S^2$ rest by their stems when in their normal positions. Pressing down on the pedal $L^2$ the lever is pulled down, which raises its other end and with it the rod $Q^2$ and the hammer-rail $R^2$, which swings forward, moving the hammers forward, so that when played the blow of the hammer upon the string will be much lighter, consequently producing a softer tone, this being the usual soft stop in upright pianos. As the lever moves it raises the arm $h^4$ of the bell-crank $J^2$, moving its other arm forward and pulling upon the arm $D^2$ of the movable board $C^2$ of the exhaust-bellows, moves the board $C^2$ against its spring $E^2$, and closes the bellows, more or less, accordingly, so that less pressure will be exerted on the air in the wind-chest, and consequently reducing the force of the blow of the key in playing for the purpose of producing lighter touch and softer tones.

In the movable board $C^2$ of the exhaust-bellows T is an opening $T^2$ into its chamber, over which on the outside of the board is a valve $U^2$, and secured to this valve and projecting backward therefrom is an arm $V^2$, having a slot $W^2$ in it at right angles to the valve, in which is disposed one end of a lever $A^3$, pivoted at $B^3$ to a support $C^3$ of the box U and connected by its other end to a rod $D^3$ at $w^4$, which at its other end is attached to one arm $y^4$ of a bell-crank lever $E^3$, pivoted at $F^3$ to the under side of the key-bed, the other arm of the bell-crank lever being connected at $a^5$ to a rod $G^3$, arranged to slide freely in supports $H^3$, and connected by its other end to the outer end of the arm $e^3$ of bell-crank U', connected to the arm V' for moving the shaft M'.

Figure 8:
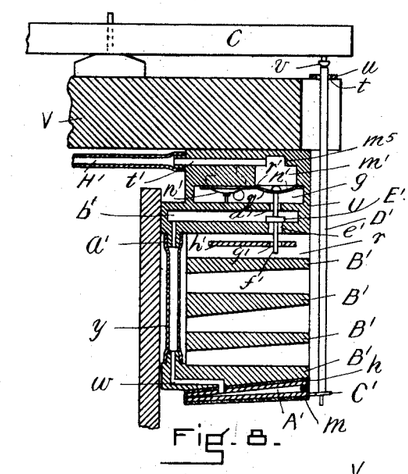
Fig. 8 is a detail sectional view similar to Fig. 4, but with some of the parts in different positions.

The operation of the instrument is as follows: The motor D having been started through its shaft and pulley E, motion is communicated to belt G to pulley H on the shaft J, through belt L to shaft N, which, turning, operates the exhausters R, exhausting the exhaust-bellows T and wind-chest S in the usual manner of operating exhaust-bellows for musical instruments. The music-roll K', containing the perforated music-sheet J' wound thereon, having been put in place and the outer end of the music-sheet passed under the raceway and attached to the take-up roll L', motion is communicated to the take-up roll from the shaft J and its cone-pulley Q' through the cone-pulley N' on shaft M' and gears $e^2$ and $d^2$, which turns it so that the music-sheet is wound upon the take-up roll from the music-roll and traveling over the raceway in the direction of the arrow $b^5$, Fig. 4. As the music-sheet so travels when a perforation $b^5$ comes over an air-duct $h^2$ air enters therein and passes through the passage G', through passage $v$ into the chamber $m'$, and presses down the flexible head $n'$ of the primary pneumatic valve E', and in such movements the valve being moved downward it opens the opening $d'$ and closes the opening $e'$, as shown in Figs. 8 and 18 more particularly, causing the air to be drawn from the pneumatic bellows A' through the tube $y$ and passage $b'$ into the wind-chest chamber $g$, closing the pneumatic bellows, which in such movement raises the sticker D', and consequently the rear end of the key C, which operates the action and causes the hammer to strike the string, sounding the same. As the unperforated portion of the music-sheet comes over the air-duct the air is cut off from entering the same, when from the operation of the exhaust-bellows the air exhausted from the chamber $g$ causes the pneumatic valve E' to rise, the escape of air through the opening $q'$ in the diaphragm allowing for the movement of the diaphragm upward, and thus the valve with it, closing the opening $d'$, and the air then enters at the opening $e'$ into passage $b'$, and passing to and filling the pneumatic bellows lowers its board $m$ and sticker and the key, all the parts falling into position for the next operation thereof, as before, when a perforation in the sheet comes over its respective air-duct in the raceway.

Figures 6, 7:
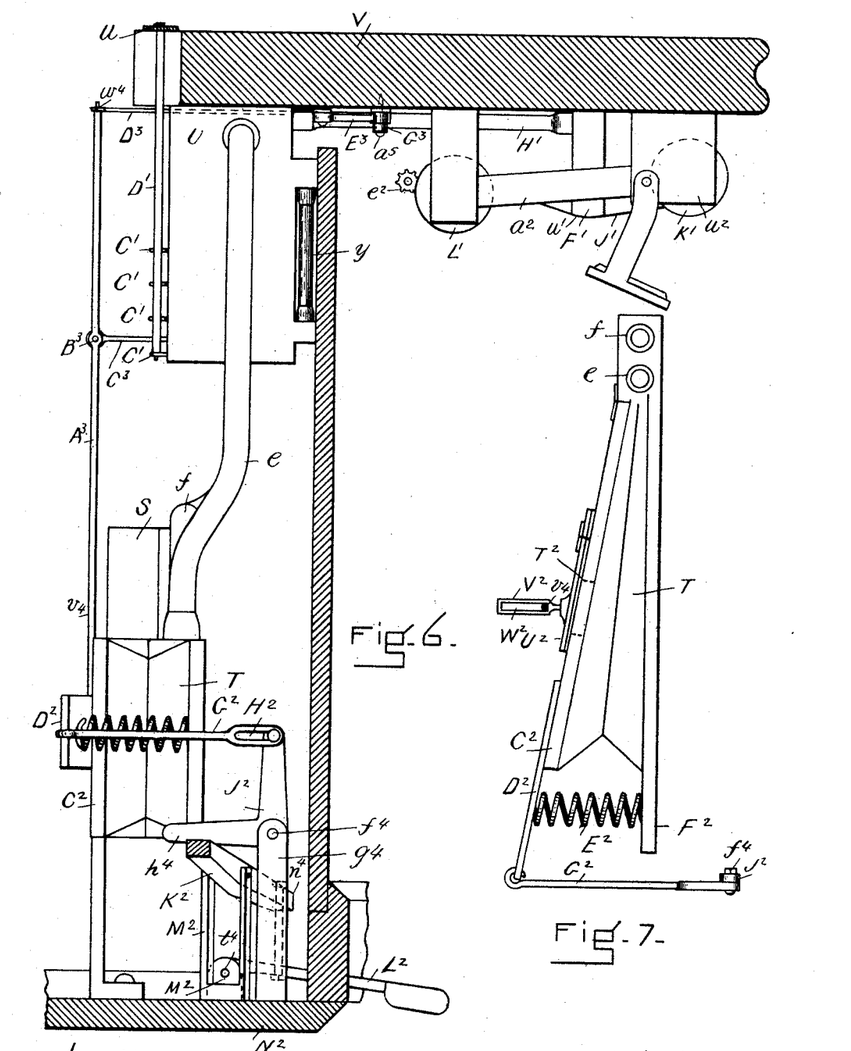
Fig. 6 is a transverse vertical section on line 6 6, Fig. 1, the parts being enlarged.
Fig. 7 is a detail plan view of some of the parts shown in Fig. 6.
Figure 11:
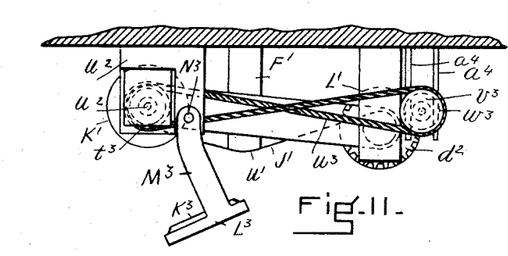
Fig. 11 is a detail side view and section on line 11 11, Fig. 2.

On the perforated music-sheet is a line of dots or marks $d^5$, which extend the length of the same, and at intervals along such line are marks of expression. This line and the marks of expression indicate to the operator as the music-sheet travels over the raceway when and how to operate the instrument when playing to produce the required expression of the music in playing. As the music-roll is under the key-bed, and therefore the operator is unable to see it, a looking-glass is provided, which is shown in the drawings in Figs. 1, 2, 3, 4, and 11 particularly, in which $K^3$ is the looking-glass, secured to a board $L^3$, which at its two ends is secured to arms $M^3$, which are pivoted at $N^3$ to the blocks $u^2$. In its normal position it is as shown in dotted line in Fig. 4, the outside $Q^3$ of its backing-board being finished or ornamented as desired, and when playing the instrument it is swung down into the position, as shown in Figs. 4, 6, and 11, below the music-roll, so that the operator looking into it observes the reflection of the perforated music-sheet and expression-marks, &c., and draws or pushes the handle $y^2$ accordingly and at the same time puts his foot on the pedal $L^2$ to close the bellows T to lessen or soften the touch, as desired. The sticker is made, preferably, in one piece of wood, having its lower end reduced in diameter a short distance therefrom, as at $e^5$, for such portion to extend through the opening $f^5$ in the rest or support $C'$ of the pneumatic bellows, the shoulder of the sticker resting on the support and the portion $e^5$ holding it in place. It can be made by having a pin or wire inserted in the end of the rod to project downward therefrom or in any suitable manner to hold the rod in position. The rests or supports for the rods are each made of metal in the form of a screw-eye to screw into the end $h^5$ of the pneumatic-bellows board $m$, which is a very convenient way of making these rests, as they can be secured in any part of the end of the bellows-board, and consequently adjusted laterally thereon to be under its respective key C, so that the sticker will be vertical and properly in place in relation to its respective key, besides enabling the pneumatic bellows to be arranged in a compact form, so that they can be conveniently placed in the piano, it being almost impossible otherwise to apply this attachment to the piano as usually constructed without especially building a piano for the purpose or enlarging the casework of a piano to which it is to be applied. The valve $U^2$ to bellows T is to admit air thereto to release the pressure upon the bellows when rewinding the music-sheet upon the music-roll after playing the tune for it to be rewound thereon easily; otherwise it would require as much power to rewind the music-sheet as it does to operate the instrument in playing the tune. The arm $V^2$ of the valve $U^2$ of the exhaust-bellows has the slot $W^2$ for its lever $A^3$ connection in order to allow play for such connection when the bellows is being operated, but being short enough to allow the lever to operate the valve to open it.

The various bell-cranks are connected, as shown, to their respective operating parts by slots, as shown, so that sufficient play will be given to them to allow for their movements and not interfere with the proper movements of the parts connected therewith.

The operating parts where abutting against each other or connected together are lined or protected with a soft material, such as felt, to prevent the parts making a noise.

The chambers $m'$ are of quite large diameter relative to the diameter of the passages $t'$ and are arranged in two horizontal rows alternately, and in order to have room for the air-passages $t'$, leading to the rear ones, the chambers $m'$ in the front row are reduced in diameter in their upper part, as shown at $m^5$ in Figs. 4, 8, and 17 and in dotted lines in the same. This insures thickness of material where the air-passages $t'$ extend between the chambers in the front row to those in the rear row, the air-passages entering and communicating with the smaller part $m^5$ of the chambers in the front row, as shown more particularly in Fig. 17. The flexible heads $n'$ to the valve $E'$ are made by securing to the chamber side of the board in which they are made a strip of quite thin flexible sheet material, such as leather, which covers all the chambers, and over each chamber serves for the flexible head to each valve, allowing the valve to freely operate.

The transverse grooves $a^2$ in the raceway-board and holes $h^2$ at its outer edge, as shown in Figs. 14, 14$^c$, 15, and 16, are marked $G'$ in other figures, they being marked in these figures as above to aid in the illustration of the particular manner of constructing the raceway-board. The advantage of the manufacture of the raceway-board, as herein described, is considerable, as it otherwise would take consirable time to bore or make the holes in a solid piece and great care in doing so.

This invention is applicable as well to other musical instruments, such as organs, &c.

Having thus described my invention, what I claim is—

1. A raceway for a perforated music-sheet constructed and consisting of a central board having transverse grooves in each side extending from each side alternately beyond the central longitudinal line of the board, a solid piece secured on one side, a piece secured on the other side having a series of holes through its thickness communicating with the grooves in the side of the central board next thereto, a piece secured over the edges of the three pieces secured together having a series of holes through its thickness and a series of holes extending into and communicating with said holes, the holes through its thickness communicating with the ends of the grooves on the opposite side of the central board, a solid piece secured on the outer side of the latter piece closing the holes on the side thereof next thereto, and a piece secured to the other edges of the three secured pieces, having a longitudinal row of holes through its thickness communicating with the transverse grooves in the central board.

2. In a board, a series of chambers in one row at one side, and another series of chambers in one row at the side of said first row and alternating in line therewith, one row of smaller diameter at their upper ends, and each chamber at its upper end having a tube or air-passage extending forward therefrom and having communication therewith and closed at its lower end by a flexible diaphragm.

3. In a board, series of chambers in one row at one side and another series of chambers in one row at the side of said first row and alternately in line therewith, one row of smaller diameter at their upper ends, and each chamber at its upper end having a tube or air-passage extending forward therefrom and having communication therewith and closed at its lower end by a flexible diaphragm, a chamber below all of said chambers in which the flexible diaphragms are arranged to move, a chamber below said chamber, one to each diaphragm-chamber, an air-passage to each lower chamber communicating with the general chamber, an air-passage to lower chamber opening to the outside and a valve to each latter air-passage connected to each diaphragm respectively.

In testimony whereof I have hereunto set my hand in the presence of two subscribing witnesses.

THOMAS J. POOLE.

Witnesses:
   EDWIN W. BROWN,
   FLORENCE I. GARRETT.